United States Patent [19]

Muneyoshi et al.

[11] Patent Number: 5,761,177
[45] Date of Patent: Jun. 2, 1998

[54] OPTICAL INFORMATION PROCESSING APPARATUS HAVING SMALL OPTICAL SYSTEM USING A PLURALITY OF BEAM EXPANDING ELEMENTS

[75] Inventors: Takahiko Muneyoshi, Odawara; Atsushi Saito, Hino, both of Japan

[73] Assignee: Hitachi, Ltd., Tokyo, Japan

[21] Appl. No.: 447,777

[22] Filed: May 23, 1995

[30] Foreign Application Priority Data

May 27, 1994 [JP] Japan ............... 6-115629

[51] Int. Cl.$^6$ ............................................. G11B 7/00
[52] U.S. Cl. ........................................... 369/112
[58] Field of Search ................... 369/44.23, 44.24, 369/112, 110, 109, 117, 120, 121

[56] References Cited

U.S. PATENT DOCUMENTS

| | | | |
|---|---|---|---|
| 5,084,783 | 1/1992 | Dewey et al. | 369/44.23 |
| 5,105,410 | 4/1992 | Maeda et al. | 369/44.23 |
| 5,247,508 | 9/1993 | Tanaka | 369/112 |
| 5,321,550 | 6/1994 | Maruyama et al. | 369/112 |
| 5,359,588 | 10/1994 | Fujita et al. | 369/112 |
| 5,412,633 | 5/1995 | Ichikawa et al. | 369/112 |
| 5,477,386 | 12/1995 | Okuda et al. | 369/112 |

FOREIGN PATENT DOCUMENTS

| | | | |
|---|---|---|---|
| 62-51046 | 3/1987 | Japan | 369/44.23 |
| 62-159354 | 7/1987 | Japan | 369/44.23 |
| 62-246149 | 10/1987 | Japan . | |
| 63-104232 | 5/1988 | Japan . | |
| 3-203046 | 9/1991 | Japan . | |
| 6-68511 | 3/1994 | Japan . | |

*Primary Examiner*—Nabil Hindi
*Attorney, Agent, or Firm*—Fay, Sharpe, Beall, Fagan, Minnich & McKee

[57] ABSTRACT

An optical information processing apparatus includes a laser diode, a first prism or a grating for deflecting a light beam projected from the laser diode along a direction substantially perpendicular to a surface of an information recording medium and also for expanding a cross section of the light beam along one direction, an objective lens for focusing the light beam onto the surface of the information recording medium, and a second prism or a grating for expanding the cross section of the light beam along one direction.

3 Claims, 8 Drawing Sheets

OPTICAL INFORMATION PROCESSING APPARATUS HAVING SMALL OPTICAL SYSTEM USING A PLURALITY OF BEAM EXPANDING ELEMENTS

BACKGROUND OF THE INVENTION

The present invention relates to an optical information processing apparatus such as an optical disk apparatus, an optical card apparatus, and an optical tape apparatus, in which information is read/written by employing optical means.

Examples of optical information processing apparatuses are an apparatus for recording and/or reproducing information with employment of light, and are known as an optical disk apparatus as one example. Very recently, a strong demand has arisen for a compact optical information processing apparatus having an optical disk apparatus. When an optical disk apparatus is made slim, a major factor of the design is the diameter of a light beam of the optical disk apparatus.

To make such a slim optical disk apparatus, the beam diameter of the traveling beam must be made small. On the other hand, to obtain a very small spot on the surface of an information recording medium under better conditions, a diameter of a light beam incident upon an objective lens must be made large. This is because such a relationship defined by the following equation [1] is established among a diameter "s" of a light spot formed on the surface of the information recording medium, a focusing distance "f" of an objective lens, a wavelength "λ" of a light beam, and an effective diameter "ω" of the objective lens:

$$s = 2kf\lambda/\omega \qquad [1],$$

where symbol "k" indicates a constant related to an intensity distribution of the light beam incident upon the objective lens, and wavefront precision.

Figure 7A:
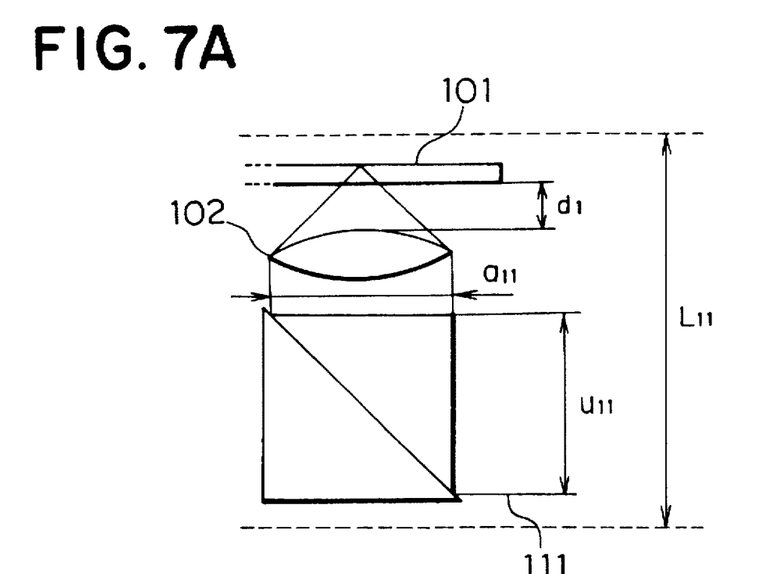
FIG. 7A and FIG. 7B indicate a relationship between an operation distance and a drive height.
Figure 7B:
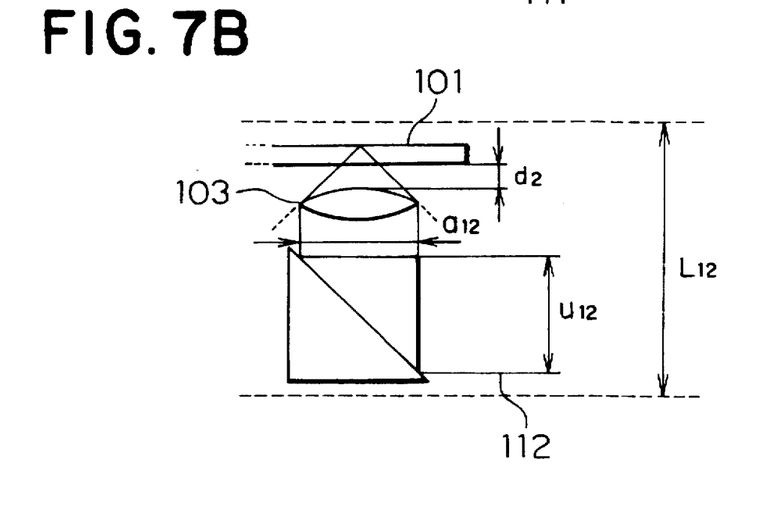

In general, a minimum beam diameter of a traveling beam within an apparatus is defined by an objective lens. Therefore, to make a thickness (drive height) of an optical disk apparatus thin, there are the following methods:

FIG. 7A and FIG. 7B represent a first method. This first method corresponds to such a method for employing an objective lens having a small aperture. FIG. 7A schematically shows an arrangement of an optical information processing apparatus with employment of an objective lens 102 having a large aperture. In this case, a diameter of a traveling beam 111 is "$u_{11}$", a diameter of a light beam incident upon the objective lens 102 is "$a_{11}$", an operation distance between the objective lens 102 and a surface of an information recording medium 101 is "$d_1$", and a thickness (drive length) of an apparatus is "$L_{11}$".

On the other hand, as indicated in FIG. 7B, when such an objective lens 103 having a short focal distance and a small diameter is employed, both of an operation distance "$d_2$" between the surface of the information recording medium 101 and the objective lens 103, and a diameter "$a_{12}$" of a light beam incident upon the objective lens 103 can be made small while the aperture number of the objective lens is made identical and the spot diameter is made identical. In connection therewith, a beam diameter "$u_{12}$" of a traveling beam 112 traveling on along the surface of the information recording medium may also be made smaller than the beam diameter "$u_{11}$" of FIG. 7A. As a consequence, as shown in the drawing, the thickness of the apparatus may also be made small, namely from $L_{11}$ to $L_{12}$.

Figure 8A:
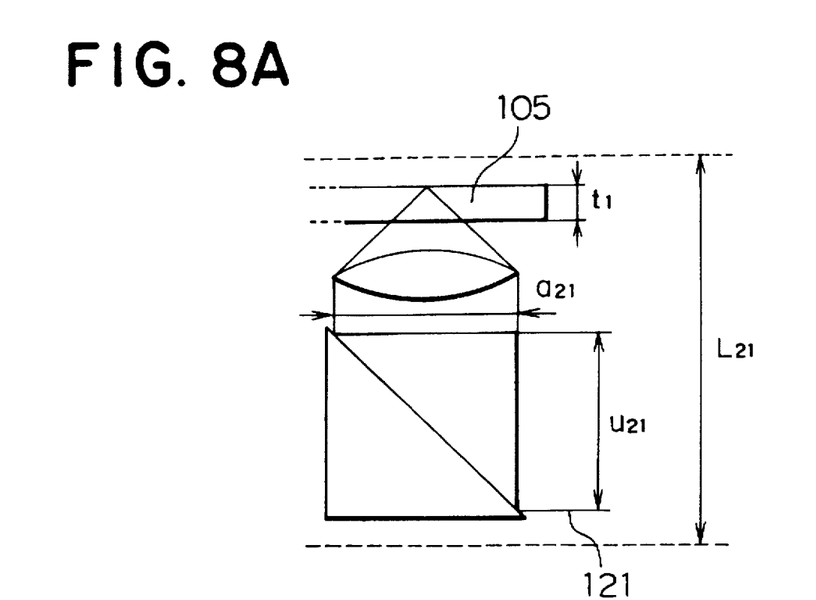
FIG. 8A and FIG. 8B show a relationship between a thickness of a board and the drive height.
Figure 8B:
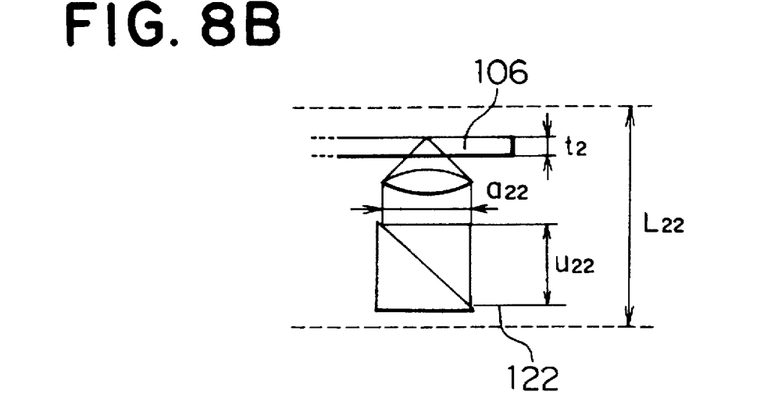

FIG. 8A and FIG. 8B show a second method. This method is for making a thickness of a transmit board of an information recording medium thin. As represented in FIG. 8A, when a board thickness of a transmit board 105 is equal to "$t_1$", a thickness of an apparatus required to assemble an objective lens used to obtain a desired spot diameter is assumed to be "$L_{21}$". At this time, as illustrated in FIG. 8B, when such a transmit board 106 having a thickness "$t_2$" thinner than the above-described thickness "$t_1$", dimensions of other optical systems may be analogously made small in connection therewith.

For example, when another transmit board 106 having a thickness of 0.6 mm is employed by substituting the presently used transmit board 105 having the thickness of 1.2 mm, the diameter "$a_{22}$" of the light beam incident upon the objective lens may be made a half thickness, i.e., $a_{21}$. As a consequence, the beam diameter "$u_{22}$" of the traveling beam 122 that travels along the surface of the information recording medium can be similarly made one half the size of the beam diameter "$u_{21}$" of the traveling beam 121, and also the thickness of the apparatus can be made small, i.e., from $L_{21}$ to $L_{22}$.

In the optical head as described in JP-A-63-104232, JP-A-3-203046, and JP-A-6-68511, the beam diameter of the beam in the apparatus, as viewed in the thickness direction of the apparatus, can be made small by employing a single reflection type beam shaping element.

SUMMARY OF THE INVENTION

There are the below-mentioned problems in the method for shortening the operation distance with employment of the objective lens having such a small aperture, the method for making the compact optical system by thinning the thickness of the transmit board of the information recording medium, and the method for using only one reflection type beam shaping element, by which the information processing apparatus is to be made slim.

Firstly, when the operation distance of the objective lens is shortened to narrow the diameter of the traveling beam, there is a risk that the objective lens will contact the surface of the information recording medium, resulting in the objective lens and surface of the information recording medium becoming scratched.

Secondly, when the thickness of the transmit board of the information recording medium is made thin to analogously reduce the diameter of the traveling beam, in order that the light spot equivalent to the above-described traveling beam is obtained via the transmit boards having the different thicknesses on the surface of the information recording medium, since the optical systems design is different, compatibility with the information recording medium having a different transmit board thicknesses would be lost. Moreover, the operation distance of the objective lens is analogously shortened. As a result, there is the risk that the objective lens will contact the surface of the information recording medium, and be scratched.

Thirdly, when only one reflection type beam shaping element is employed, the beam diameter of the beam within the apparatus can be reduced along the thickness direction of the apparatus. However, the beam diameter of this traveling beam along the direction vertical to this thickness direction, must be made larger than the effective diameter of the objective lens as represented in JP-A-63-104232, JP-A-3-203046, and JP-A-6-68511.

Consequently, as indicated in JP-A-3-203046, and JP-A-6-68511, when a rotation symmetric collimation lens is employed, since the lens diameter along the thickness direction of the apparatus becomes larger than the effective diameter of the objective lens, even if the reflection type beam shaping prism is employed, this design cannot contribute to the compactness of the apparatus. When the elliptical collimation lens is employed as disclosed in JP-A-63-104232, the lens diameter along the thickness direction of the apparatus can be made small, so that the apparatus can be made compact. However, there are such problems. That is, it is rather difficult to manufacture the elliptical collimation lens, as compared with the normal rotation symmetric lens. Since the collimation lens has the elliptical shape, adjustments are required for the peripheral portion of the optical axis. As a consequence, a total number of adjusting portions is increased. Thus, under such circumstance, the cost of the optical information processing apparatus would be increased.

An object of the present invention is to provide a slim and low-cost optical information processing apparatus capable of easily adjusting optical components and also of having compatibility of board thickness of an information recording medium and of an operation distance of an objective lens.

To achieve the above-described object, according to the present invention, a plurality of one direction beam expanding means are combined with each other, which expand a beam diameter of a light beam along one direction, and one of these beam expanding means includes another function as a deflecting means.

That is, according to the present invention, in an optical information processing apparatus including a light source; deflecting means for deflecting a light beam projected from said light source to a direction substantially perpendicular to a surface of an information recording medium; an objective lens for focusing said light beam onto the surface of said information recording medium; and a photodetector for detecting a reflection beam reflected from the surface of said information recording medium, there are provided a plurality of one direction beam expanding means for expanding a cross section of the light beam along one direction, and also one of said plurality of one direction beam expanding means has another function as said deflecting means.

The plurality of one direction beam expanding means has a function to expand a diameter of the light beam along different directions.

Both the one direction beam expanding means and the one direction beam expanding means having the function as said deflecting means are preferably arranged in such a manner that the beam expanding directions with respect to the beam cross sections are substantially perpendicular directions.

At least one set of the one direction beam expanding means excluding said one direction beam expanding means having the function as said deflecting means is preferably arranged in such a manner that the beam expanding directions with respect to the beam cross sections are substantially parallel to the surface of said information recording medium.

When a laser diode is employed as a light source, a beam expansion magnification along a short axial direction of an elliptical-shaped light intensity distribution in a far-field image of the light beam projected from said laser diode is preferably greater than that along a long axial direction of said intensity distribution.

The one direction beam expanding means may be arranged by employing such optical elements as a prism and a grating, or by combining a plurality of these optical elements.

The plural one direction beam expanding means to be combined with each other may be constructed by the same sorts of beam expanding means arranged by the same sorts of optical elements, or as different sorts of beam expanding means arranged by different sorts of optical elements.

The optical information processing apparatus can be made slim without changing the thickness of the transmit board of the information recording medium and the operation distance of the objective lens while maintaining compatibility by reducing the beam diameter of the light beam traveling within the apparatus, and by expanding this beam diameter, and thereafter by applying the expanded beam into the objective lens. In this case, since one of these one direction beam expanding means also functions as the above-described deflecting means, a total number of components may be reduced and the cost may be decreased.

A plurality of one direction beam expanding means are employed and the cross section of the projected beam is expanded along more than one direction, whereby the beam diameter of the traveling beam traveling along the surface of the information recording medium can be made small. As a consequence, the optical component can be analogously made compact.

Figure 9A:
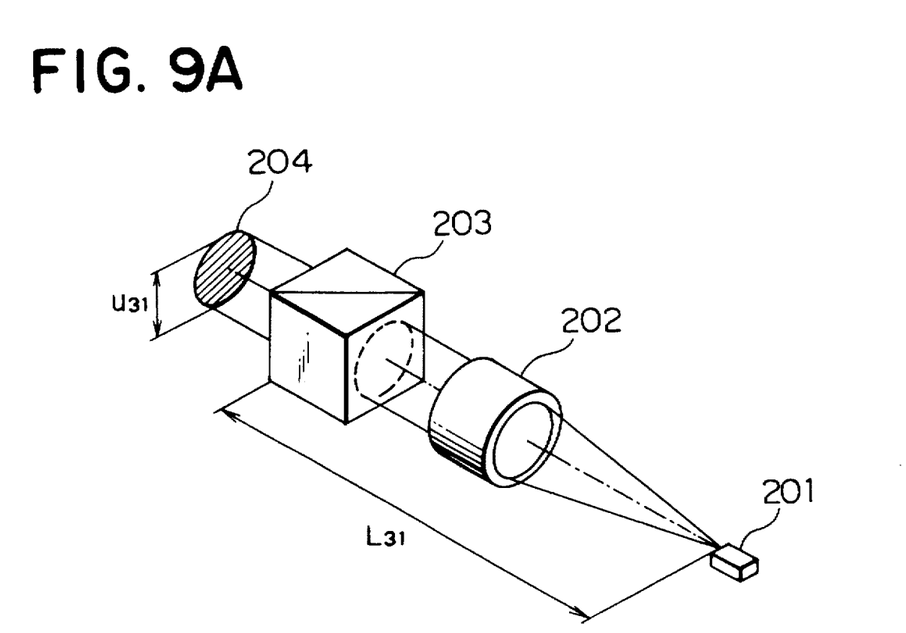
FIG. 9A and FIG. 9B represent a relationship between a diameter of a traveling beam and a dimension of an optical element.
Figure 9B:
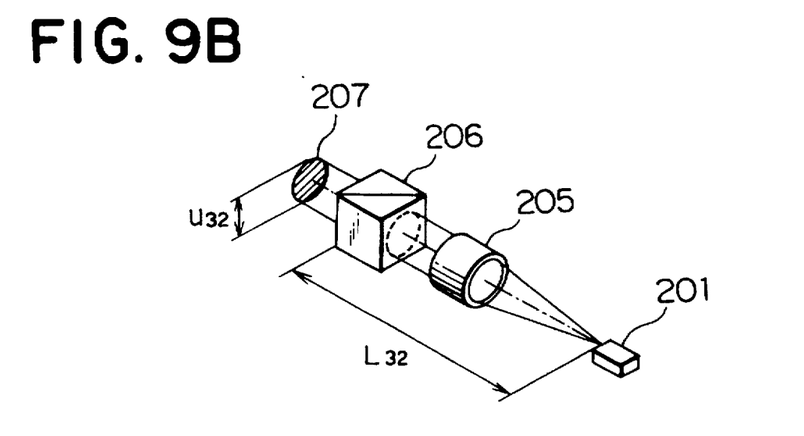

This principle idea is illustrated in FIG. 9A and FIG. 9B. For instance, comparing such a case that, as shown in FIG. 9A, a large cross section 204 of a traveling beam having a beam diameter of "$u_{31}$" is obtained from a light source 201, with another case that, as shown in FIG. 9B, a small cross section 207 of a traveling beam having a beam diameter of "$u_{32}$" is obtained from this light source, it is shown that the dimensions of the elements can be analogously made small, resulting from the beam diameter being made smaller. For instance, a dimension of a collimation lens 205 is smaller than that of another collimation lens 202, and similarly, a dimension of a beam splitter 206 is smaller that of another beam splitter 203. Also as to an optical path length, it can be reduced from $L_{31}$ to $L_{32}$, so that the optical information processing apparatus can be made thin and compact. Since a rotation-symmetrical lens may be employed as a collector lens, this lens may be relatively easily manufactured and adjusted.

A plurality of one direction beam expanding means (one of them has a function as deflecting means) are arranged in such a manner that the beam expansion directions in the beam cross section are intersected substantially perpendicular to each other. As a result, the beam can be effectively expanded, and also a total number of required beam expanding means may be minimized.

Figure 10:
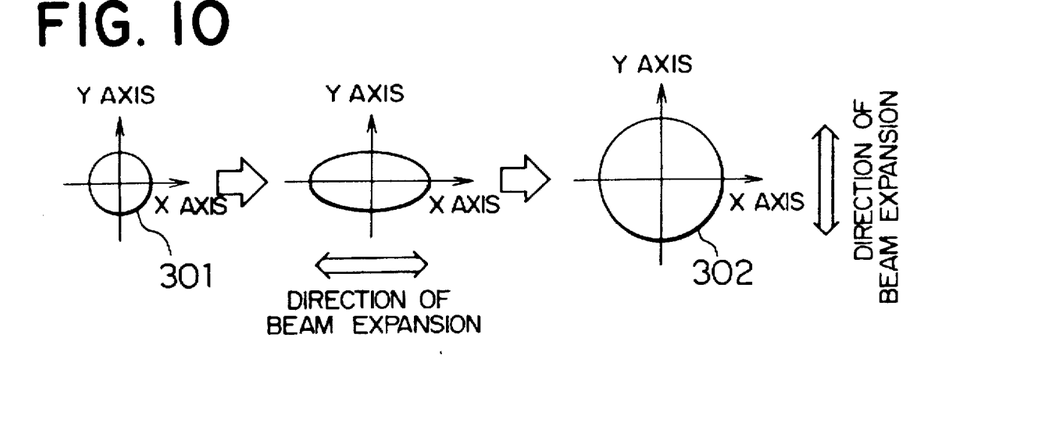
FIG. 10 schematically shows conditions of expanding a beam cross section.

A principle idea is illustrated in FIG. 10. As shown in FIG. 10, when an expansion is made from a circular beam cross section 301 having a small diameter into a circular beam cross section 302 having a large diameter, the light beam may be once expanded along an x-direction and a y-direction.

Figure 11A:
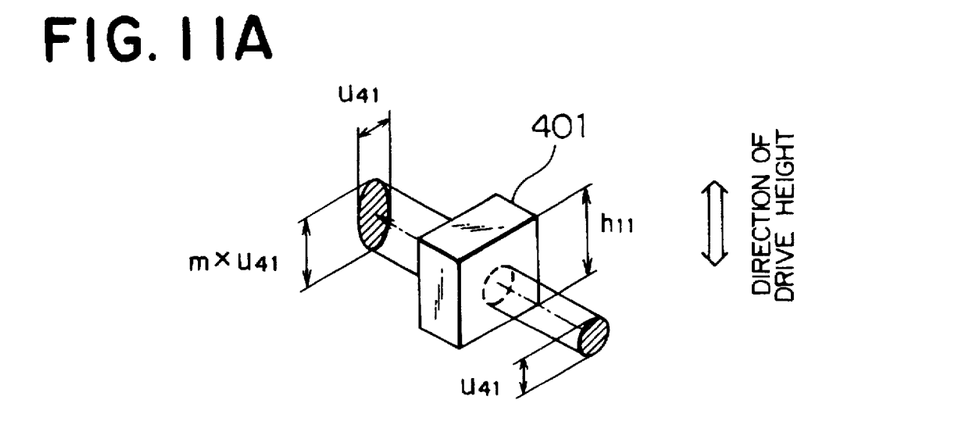
FIG. 11A and FIG. 11B indicate a relationship between an expansion direction of the beam cross section and a height of beam expanding means.
Figure 11B:
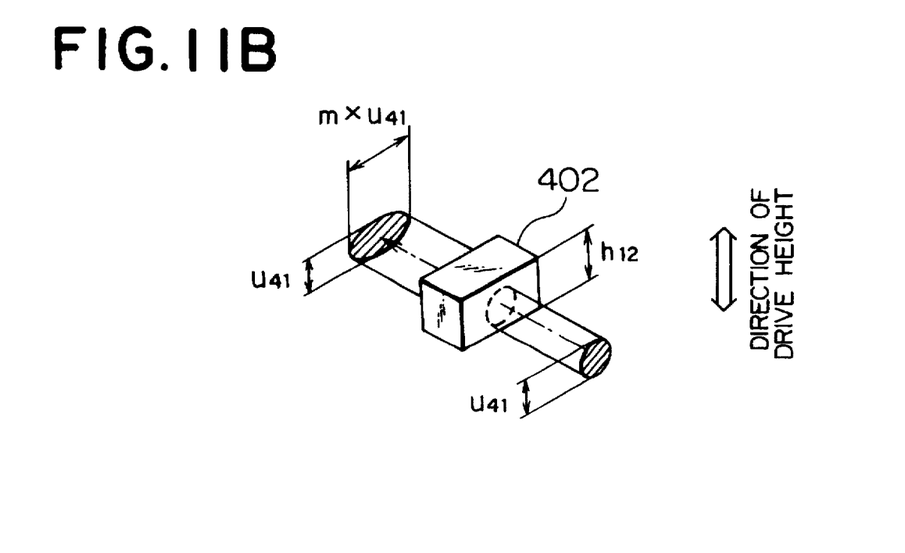

Then, at least one set of the one direction beam expanding means excluding said one direction beam expanding means having the function as said deflecting means is arranged in such a manner that the beam expanding directions with respect to the beam cross sections are substantially parallel to the surface of said information recording medium. As a result, the height of the beam expanding means may be lowered, as compared with such a case that the beam expansion direction is set to a direction substantially perpendicular to the surface of the information recording medium, namely the thickness (drive height) direction of the apparatus. For example, when such a beam whose diameter is "$u_{41}$" is multiplied by "m" along one direction, as shown in FIG. 11A and FIG. 11B, the height of the beam expanding means can be reduced from the height $h_{11}$ of the beam expanding means 401 into the height $h_{12}$ of the beam expanding means 402. As a consequence, the thickness of the optical information processing apparatus can be made thin.

Figure 12A:
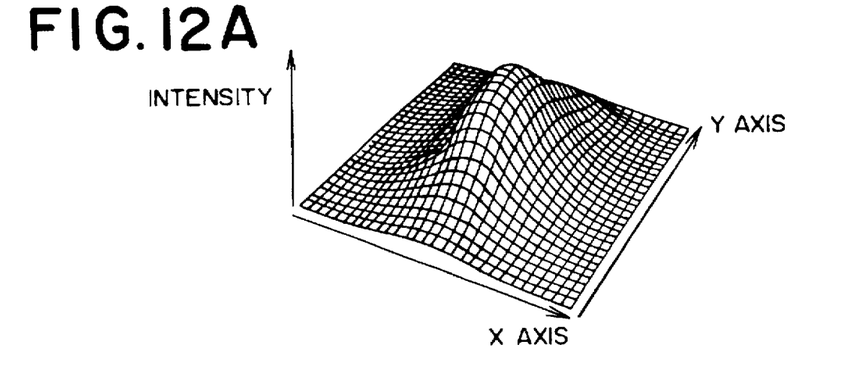
FIG. 12A and FIG. 12B indicate an intensity distribution of the beam cross section.
Figure 12B:
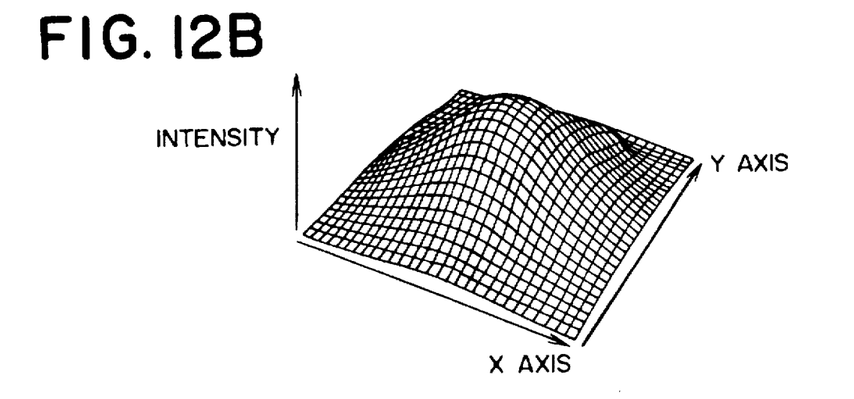

Also, a beam expansion magnification by the beam expanding means along a short axial direction of an elliptical-shaped light intensity distribution in a far-field image of the light beam projected from a laser diode is greater than that of the beam expanding means along a long axial direction of the intensity distribution. As a consequence, the intensity distribution of the beam incident upon the objective lens may be made as an isotropic intensity distribution with respect to a center of an optical axis. For instance, as illustrated in FIG. 12A, in the case of an elliptical intensity distribution in the far-field image of the laser diode, the beam expansion magnification along the x-direction is made larger than that along the y-direction, so that such an isotropic intensity distribution can be obtained with respect to the center of the optical axis, as shown in FIG. 12B. As a result, a more isotropic very small spot can be obtained on the surface of the information recording medium.

DESCRIPTION OF THE PREFERRED EMBODIMENTS

Referring now to the drawings, an optical information processing apparatus according to an embodiment of the present invention will be described.

Figure 1:
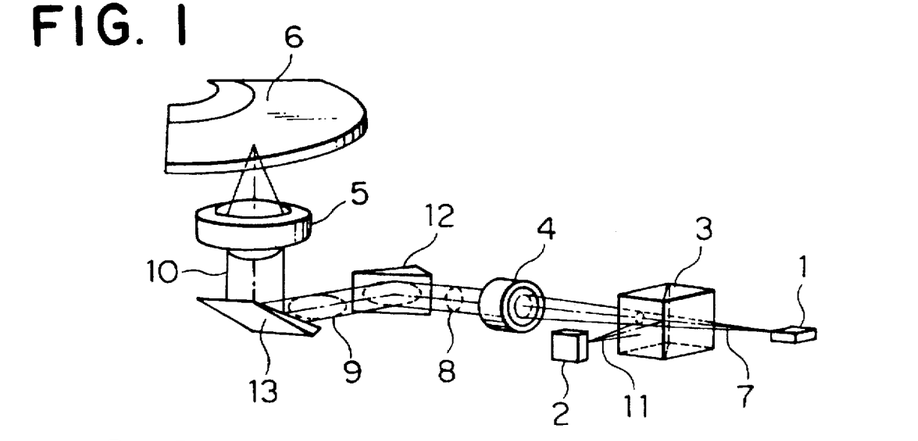
FIG. 1 schematically shows an arrangement of an optical information processing apparatus according to an embodiment of the present invention.

FIG. 1 is a perspective view for indicating a basic arrangement of an optical information processing apparatus according to an embodiment of the present invention. A laser beam 7 projected from a laser diode 1 passes through a beam splitter 3, and then becomes parallel light by way of a collimation lens 4, so that the resultant laser light becomes a beam 8 whose cross section is substantially circular. The circular beam 8 is expanded by a one direction beam expansion means 12 along one direction, namely a direction parallel to a surface of an information recording medium 6, so that the expanded beam becomes an elliptical beam 9. At this time, the beam dimensions of the circular beam 8 and the elliptical beam 9 are not changed along a direction of a drive height. The elliptical beam 9 is expanded by a one direction beam expansion means 13 having another function of a deflecting element, so that the expanded elliptical beam becomes an expanded beam 10 substantially normal to the surface of the recording medium 6. At this time, the beam expansion direction of the beam expanding means 12 is intersected with the beam expansion direction of the beam expanding means 13 at a substantial right angle with respect to the cross section of these beams.

The expanded beam 10 is focused onto the information recording medium 6 by an objective lens 5. A light beam reflected from the surface of the information recording medium 6 travels along an optical path opposite to the light beam incident path, and then is separated by the beam splitter 3 to become a detection beam 11 which will then be detected by a photodetector 2.

Figure 4A:
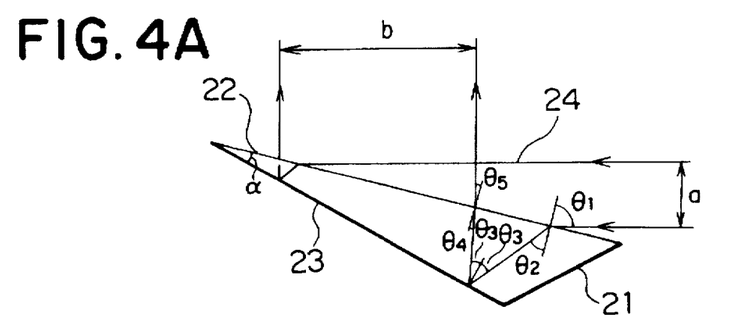
FIG. 4A to FIG. 4C are illustrations for explaining expansion of a beam by way of a wedge prism.
Figure 4B:
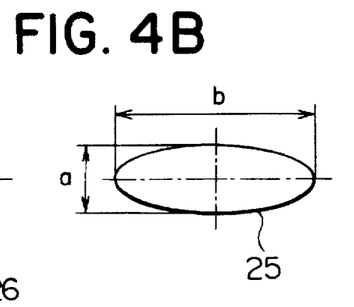
Figure 4C:
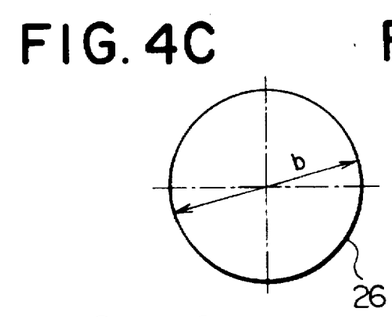

The one direction beam expanding means 12 and 13 of this embodiment is constructed of a wedge prism 21 as shown in FIG. 4A. A vertical angle of the wedge prism 21 is equal to "$\alpha$", and this wedge prism 21 has a refracting surface 22 through which the light passes, and a reflecting surface 23 for reflecting the light. As shown in FIG. 4, assuming now that a light beam 24 (see FIG. 4B) with an elliptical cross section 25 in which, for example, a length of a long axis is "b" and a length of a short axis is "a" is incident upon the wedge prism 21, this light beam 24 is projected as a light beam having a circular cross section 26 with a diameter of "b" (see FIG. 4C). In other words, the light beam 24 is expanded by the wedge prism 21 along one direction.

Now, assuming that a ratio "m" of "a" to "b" is defined as the following equation [2], when the wedge prism 21 converts the beam cross section 25 into the beam cross section 26, this wedge prism 21 may be recognized as a beam expanding means with a beam expansion magnification "m".

$$m=b/a \qquad [2]$$

Also, this magnification "m" is expressed by the following equation [3] based on the beam incident angle and the beam projection angle. It should be noted that there are relationships among $\theta_1$, $\theta_2$, $\theta_3$, $\theta_4$, $\theta_5$ and $\alpha$ as defined in the below-mentioned equations [4] to [7].

$$m=\cos\theta_2 \cos\theta_5/\cos\theta_1 \cos\theta_4 \qquad [3]$$

$$\sin\theta_1=n\sin\theta_2 \qquad [4]$$

$$\sin\theta_5=n\sin\theta_4 \qquad [5]$$

$$\theta_3=\theta_2-\alpha \qquad [6]$$

$$\theta_4=\theta_3-\alpha \qquad [7]$$

It should also be noted that symbol "n" indicates a refractive index of a material used to form the wedge prism 21, and a refractive index of air is selected to be 1.

As described above, two sets of one direction beam expanding means for expanding the diameter of the beam each along one direction are arranged in such a manner that with respect to the beam cross sections, the respective expansion directions are intersected with each other along substantially right-angle directions. Accordingly the dimensions of the traveling beams 8 and 9 of the optical information processing apparatus along the drive height direction can be made small without changing the diameter of the beam 10 incident upon the objective lens 5 as in the prior art. As a consequence, the optical information processing apparatus can be made slim while maintaining compatibility of the thickness of a transmit board of the information recording medium and of the operation distance of the objective lens.

Figure 2:
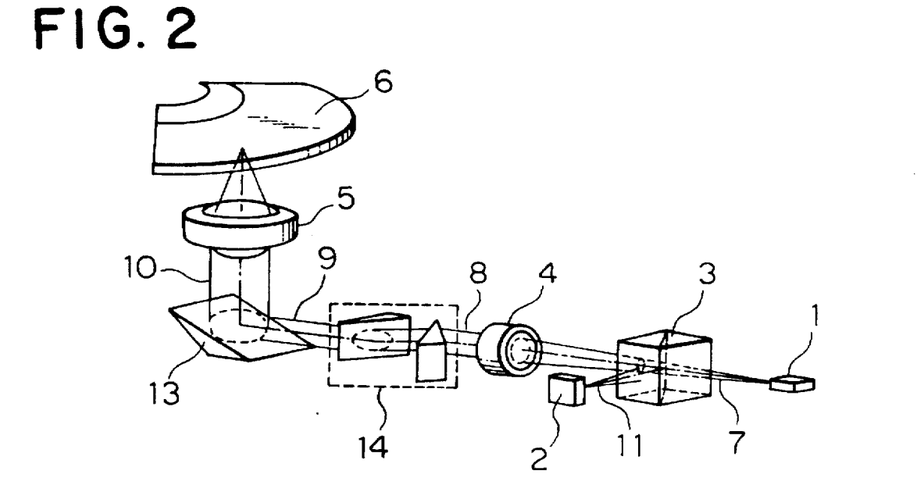
FIG. 2 schematically represents an arrangement of an optical information processing apparatus according to another embodiment of the present invention.

FIG. 2 is a perspective view for showing a basic structure of an optical information processing apparatus according to another embodiment of the present invention. It should be understood that in FIG. 2, portions having the same numerals as those of FIG. 1 perform the same operations.

A light beam 8 with a substantially circular cross section, which has passed through a beam splitter 3 and then has been converted into parallel light by a collimation lens 4, is expanded by a one direction beam expanding means 14 only along a direction in parallel to a surface of an information recording medium 6, so that this expanded light beam becomes a beam 9 with an elliptical cross section. The elliptical beam 9 is expanded by another one direction beam expanding means 13 having also the function of a deflecting element along a direction substantially perpendicular to the expansion direction by the one means beam expanding direction 14, as viewed in the beam cross section. Thus, the expanded light beam becomes an enlarged beam 10 with a circular cross section, which is located substantially perpendicular to the surface of the recording medium 6.

Figure 5A:
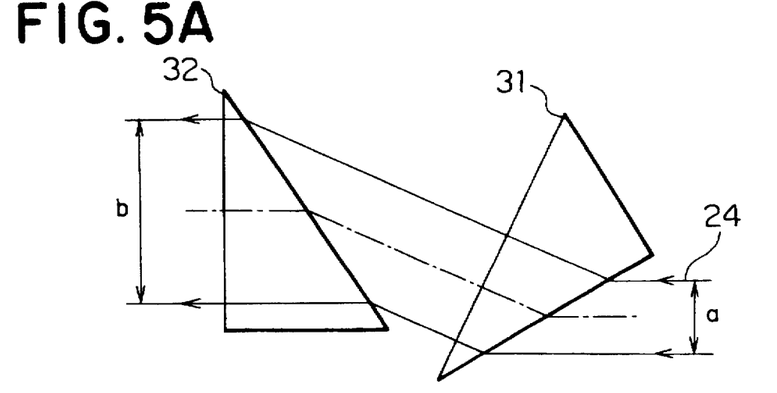
FIG. 5A to FIG. 5C are illustrations for explaining expansion of a beam by way of a triangle prism.
Figure 5B:
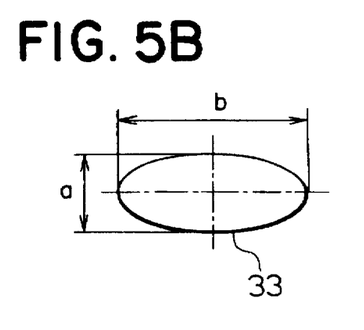
Figure 5C:
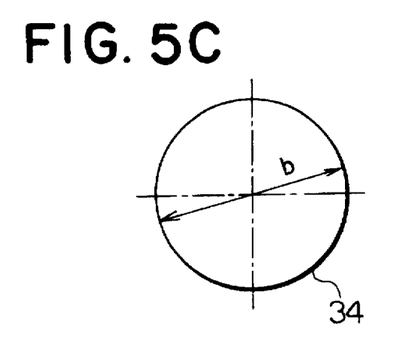

The one direction beam expanding means 14 is constructed of, as shown in FIG. 5A, two triangle prisms 31 and 32. Similar to the wedge prism 21 of FIG. 4A, the triangle prisms 31 and 32 of FIG. 5A may convert a light beam 24 having an elliptical cross section 33 into a light beam having a circular cross section 34. As shown in FIG. 5B, the elliptical cross section 33 of the optical beam 24 has a length "b" of a long axis and a length "a" of a short axis. Also, as indicated in FIG. 5C, the circular cross section 34 of the light beam has a diameter of "b".

Also, in accordance with this second embodiment, the dimensions of the traveling beams 8 and 9 of the optical information processing apparatus can be made small along the drive height direction, while the diameter of the optical beam 10 incident upon the objective lens 5 is not changed from the conventional diameter. Thus, the optical information processing apparatus can be made slim while maintaining compatibility of the thickness of the transmit board, of the recording medium and of the operation distance of the objective lens.

Figure 3:
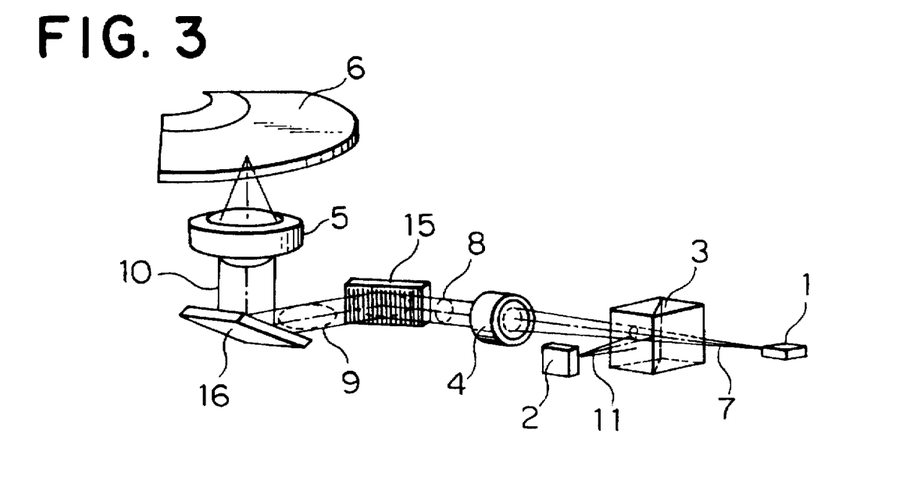
FIG. 3 schematically indicates an arrangement of an optical information processing apparatus according to another embodiment of the present invention.

FIG. 3 is a perspective view for showing a basic structure of an optical information processing apparatus according to another embodiment of the present invention. It should be understood that in FIG. 3, portions having the same numerals as those of FIG. 1 perform the same operations.

Figure 6A:
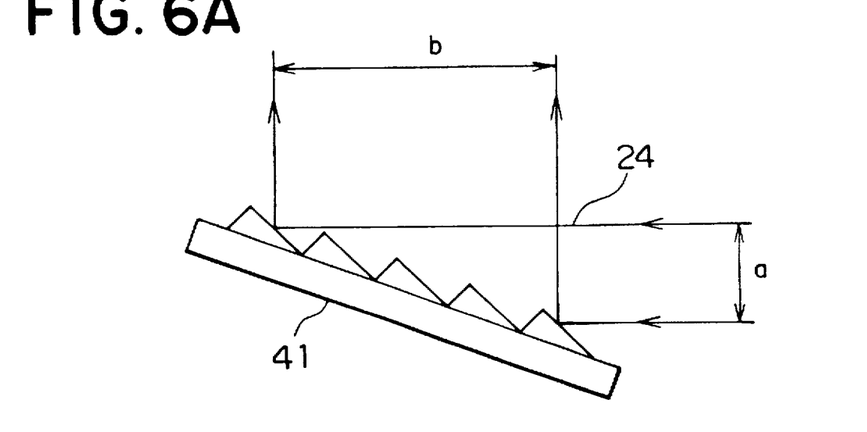
FIG. 6A to FIG. 6C are illustrations for explaining expansion of a beam by way of a reflecting grating.
Figure 6B:
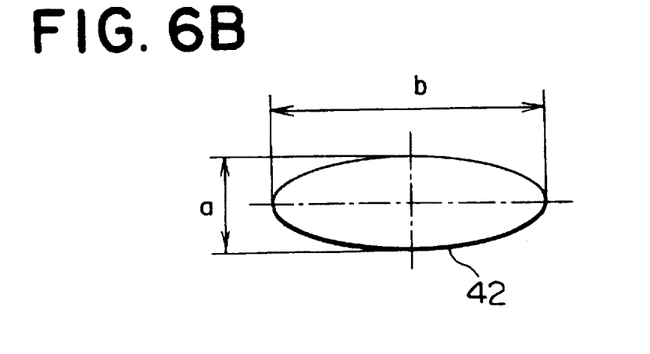
Figure 6C:
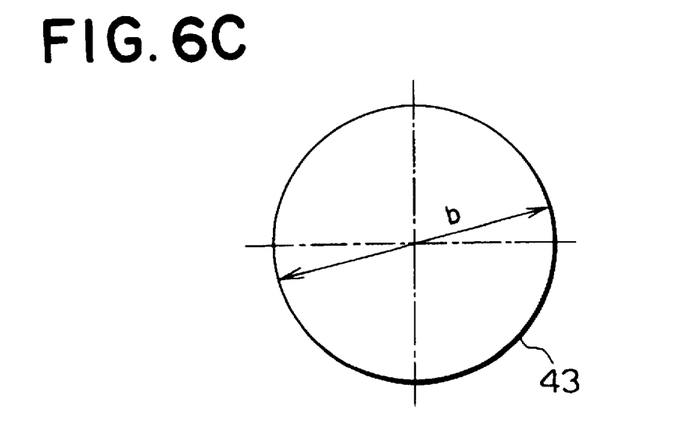

One direction beam expanding means 15 and 16 according to this third embodiment are arranged by a reflecting grating 41 as shown in FIG. 6A. Similar to the wedge prism 21 of FIG. 4A, the reflecting grating 41 converts a light beam 24 having an elliptical cross section 42 into a light beam having a circular cross section 43. The light beam 24 has an elliptical cross section 42 wherein a length of a longer axis is "b" and a length of a shorter axis is "a", as shown in FIG. 6B, whereas the light beam has such a circular cross section 43 whose diameter is "b", as shown in FIG. 6C.

Although as the diffraction light, any diffraction light having arbitrary orders other than zero-order diffraction light may be utilized, there is a merit that first-order diffraction light is employed, taking account of the light utilization efficiency. It should be noted that a reflecting type grating is to diffract a light beam on a surface thereof, and an element of the reflecting type grating can be made slim, since the light beam does not enter into the inside of this element, which is the same for the wedge prism of FIG. 4A. When this reflecting type grating would be utilized as the beam expanding means functioning also as a deflecting means, there is a merit that an apparatus can be made slim.

Since other operations of the reflecting grating 41 are similar to those of the wedge prism 21, a detailed explanation thereof is omitted.

FIG. 13A, FIG. 13B, FIG. 14A and FIG. 14B represent another example of optical elements used to expand a diameter of a light beam. These examples use cylindrical lenses, and these cylindrical lenses may be employed by substituting them for the prisms 12 and 13 of FIG. 1, and the gratings 15 and 16 of FIG. 3. With a cylindrical lens, a diameter of a light beam may be varied while the light is passed along a straight line without any polarization process.

Figure 13A:
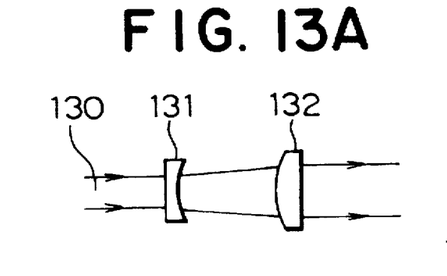
FIG. 13A and FIG. 13B are an upper surface view and a side view of an optical element whose beam diameter is expanded.
Figure 13B:
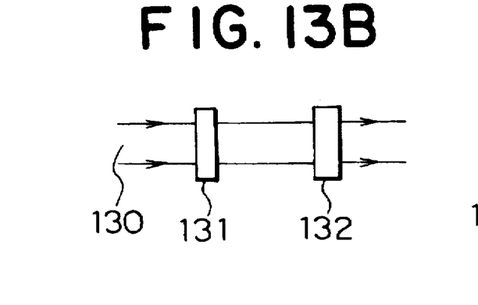

FIG. 13A and FIG. 13B show a first example with employment of such a cylindrical lens. FIG. 13A is an upper view and FIG. 13B is a side view. A light beam 130 is expanded by employing cylindrical lenses 131 and 132 only along one direction of a diameter of this light beam.

Figure 14A:
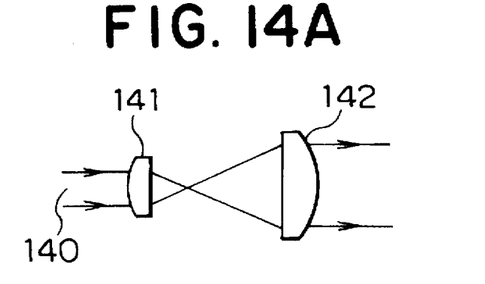
FIG. 14A and FIG. 14B are an upper surface view and a side view of an optical element whose beam diameter is expanded.
Figure 14B:
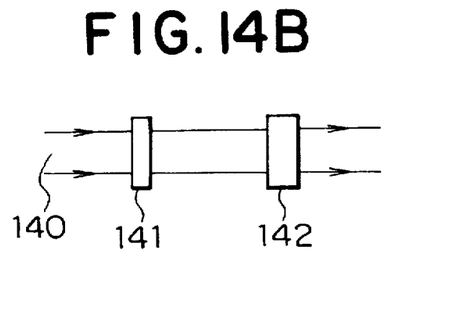

FIG. 14A and FIG. 14B represent a second embodiment with employment of a cylindrical lens. FIG. 14A is an upper view and FIG. 14B is a side view. A light beam 140 is expanded by two cylindrical lenses 141 and 142 only along one direction of a diameter of this light beam.

As previously explained, according to the present invention, since the operation distance between the objective lens 5 and the information recording medium 6 need not be varied, which is different from the prior art, there is substantially no risk that the objective lens 6 would come in contact with the surface of the information recording medium 6 to cause scratches. There is another merit that since the thickness (drive height) of the transmit surface of the information recording medium is not required to be changed, which is different from the prior art, compatibility could be maintained. Next, in comparison with the case in which only one reflecting type beam element is employed, since the traveling beam can be expanded along more than two directions and then be incident upon the objective lens, a narrow traveling beam may be employed. Also, there are such merits that the dimensions of the beam splitter 3 and the collimation lens 4 can be three-dimensionally made compact, and the entire apparatus can be made compact and slim. Since a rotation symmetry lens may be employed as the collimation lens 4, there is another merit that the lens can be easily manufactured and adjusted.

In accordance with the present invention, it is possible to realize such a slim and low-cost optical information processing apparatus capable of easily adjusting the optical components and also having the compatibility of the board thickness, of the information recording medium and of the operation distances of the objective lens.

What is claimed is:

1. An optical information processing apparatus, comprising:
   a laser diode;

a first optical element having at least one of a prism, a grating, and a cylindrical lens, for deflecting a light beam projected from said laser diode along a direction substantially perpendicular to a surface of an information recording medium, and also for expanding the light beam in one direction at a cross section perpendicular to a light beam traveling direction; and a second optical element having at least one of a prism, a grating, and a cylindrical lens, for expanding the light beam in another direction at a cross section perpendicular to another light beam traveling direction; and wherein one of said first and second optical elements causes a light beam expansion magnification along a short axial direction of an elliptical-shaped light intensity distribution in a far-field image of the light beam projected from said laser diode which is greater than a light beam expansion magnification of the other of said first and second optical elements along a long axial direction of said intensity distribution.

2. An optical information processing apparatus as claimed in claim 1 wherein, said first and second optical elements are arranged in such a manner that the beam expanding direction of said first optical element is substantially perpendicular to the beam expanding direction of said second optical element.

3. An optical information processing apparatus as claimed in claim 2 wherein, said second optical element is arranged in such a manner that the beam expanding direction of said second optical element with respect to the beam cross section is substantially parallel to the surface of an information recording medium.

* * * * *